Sept. 17, 1935.　　M. H. BALLARD　　2,014,462

SHOE MACHINE

Filed June 5, 1933

INVENTOR
Milton H. Ballard
By his Attorney
Harlow M. Davis

Patented Sept. 17, 1935

2,014,462

UNITED STATES PATENT OFFICE 2,014,462

SHOE MACHINE

Milton H. Ballard, Beverly, Mass., assignor to United Shoe Machinery Corporation, Paterson, N. J., a corporation of New Jersey Application June 5, 1933, Serial No. 674,332
In Great Britain October 10, 1932

5 Claims. (Cl. 12—1)

This invention relates to machines for operating upon shoe parts and is herein illustrated as embodying a novel driving mechanism for said machines.

It is sometimes desired to support shoe machines for operation in different positions angularly related to one another thereby to suit the convenience of the operator. For example, when a solvent-applying machine is utilized in connection with a sole-attaching machine for applying soles to shoes by the cement process it is sometimes desired to have the operator of the sole-attaching machine operate also the solvent-applying machine, while at other times it is desired to have an individual operator for the solvent-applying machine. Under these circumstances greater convenience is secured if the solvent-applying machine may be turned from one position to another without interfering with the driving connection.

This result is secured, in accordance with features of the invention, by mounting the machine for adjustment upon a supporting post and driving the machine through a power-transmitting double pulley rotatable about the axis of said post. In the illustrated construction, pairs of idlers are supported on brackets at opposite sides of the double pulley, thereby permitting relative adjustment of the machine upon the post without disturbing the driving connection. In accordance with another feature of the invention the connection between the treadle and a control lever on the machine extends through the supporting column and the post substantially coaxially therewith so that relative adjustment of the machine on the post does not interfere with this treadle connection.

Figure 1:
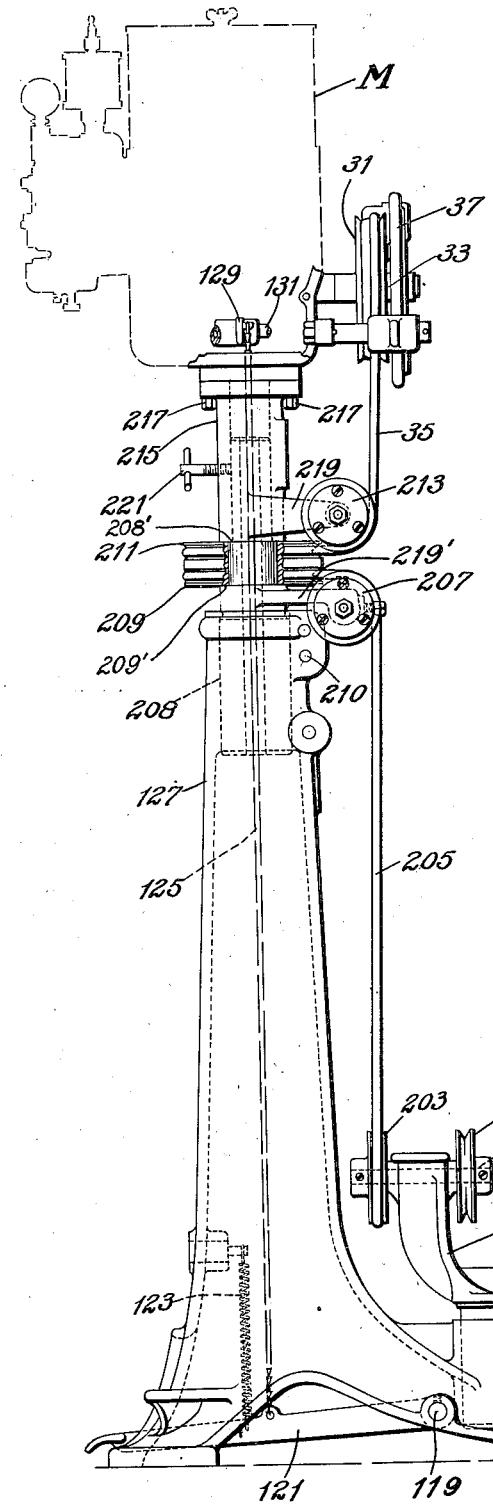
Figure 2:
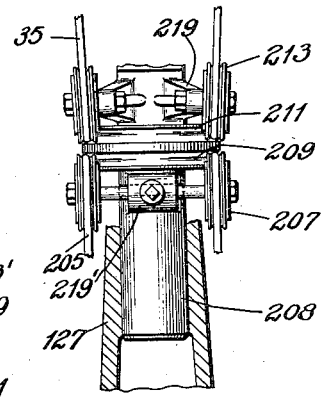

These and other features of the invention will be better understood from a consideration of the following specification taken in connection with the accompanying drawing, in which Fig. 1 is a side elevation of the driving mechanism with a machine shown in dotted outline; and Fig. 2 is a fragmentary elevation of the driving mechanism taken at right angles to Fig. 1.

In the drawing a machine M for operating upon shoe parts is shown in dotted outline except that there is shown in full lines a loose pulley 31 and a fast pulley 33 for driving the machine by means of a belt 35 which may be shifted from one pulley to the other by a belt shifter 37. The machine is also illustrated as embodying a control lever 129 pivoted upon a cross-rod 131. This control lever will be used to determine the position of a movable part of the machine. For example, if the driving mechanism is used for a solvent applying machine, though it will be understood that the invention is not limited to use with this or any particular machine, the control lever may be arranged to bring one of the feed rolls (not shown) toward the other thereby to engage the work. It may also be used to open a valve (not shown) controlling the flow of solvent to the work. This machine is supported upon a column 127 at the upper end of which there is clamped by bolts 210 a hollow post 208. Upon the upper end of this post 208 is clamped a sleeve 215 by a hand screw 221. The machine M is secured to a flange at the upper end of this sleeve 215 by bolts 217. It will be noted that the upper end of the post 208 is reduced and that a shoulder 208' is provided on the post against which the lower end of the sleeve rests, thereby taking the weight of the machine upon this shoulder and allowing it to be turned readily about the post 208 merely by loosening the clamp screw 221. Rotatable about the post 208 and resting upon a shoulder 209' thereon is a power-transmitting member in the form of a double pulley 209, 211 the two parts of which, as shown, are integral. This pulley is positioned on the post 208 between the column 127 and the sleeve 215. The belt 35 passes over a pair of ball-bearing idlers 213 supported upon brackets 219 which, as shown, are integral with the sleeve 215, and then around the upper half 211 of the double pulley. The idlers are so fixed in position with respect to the pulleys 31, 33 and the pulley upper part 211 that they maintain a perfect driving connection between the pulley part 211 and the machine quite regardless of the position of the sleeve 215, and hence the machine M, upon the post 208.

This post 208 is also provided with a bracket 219', here shown as integral with the post 208, by means of which there is supported a pair of ball-bearing idlers 207. Near the base of the column and upon a bracket 201, the position of which may be adjusted after loosening a clamp nut 201', there is supported a counter shaft 199 carrying a pulley 203. A belt 205 from the pulley 203 extends around the idlers 207 and the lower pulley part 209, thereby driving this double pulley 209, 211. The counter shaft also has a pulley 203' for a belt connection to a source of power which may be a motor (not shown) or a driven part of the sole-attaching machine (not shown). The counter shaft 199 may be made in one piece or sub-divided and connected by reducing gears (not shown).

At the base of the column is mounted a treadle 121 upon a rod 119. This treadle is normally supported by a spring 123 and is connected to a chain 125 extending upward through the column and the hollow post 208, substantially coaxially therewith, to the control lever 129. This chain 125 will twist when the position of the machine is adjusted without affecting its operability. If a rod (not shown) is substituted, a swivel connection must be utilized at one end.

In the operation of the machine, the machine-supporting sleeve 215 may be clamped in various positions angularly related to one another by means of the hand screw 221 without thereby affecting either the chain 125 connecting the treadle to the control lever 129 or affecting the driving connection between the counter shaft 199 and the machine.

Having described my invention, what I claim as new and desire to secure by Letters Patent of the United States is:

1. The combination with a column, of a machine variable in angular position about the column and having a driven member and a movable control part for altering the operating condition of the machine, a power-transmitting member rotatable about the axis of the column and having lower and upper portions, means carried by the column and joined to the lower portion of the power-transmitting member for driving it, a connection from an upper portion of the transmitting member to the driven member of the machine operable irrespective of the angular position of the machine, and a controlling connection for the machine passing substantially axially through the column and joined to said control part.

2. The combination with a machine for operating upon shoe parts and having a driven member, of a column, an upright post supported at the top of said column, means for clamping said machine in various angular positions around the axis of said post, a double pulley rotatable upon said post between the column and the machine, idlers adjacent to and above said pulley for guiding a belt connecting the machine and the pulley irrespective of the position of the machine upon the post, and means for driving said pulley.

3. The combination with a machine for operating upon shoe parts and having a driven member, of a supporting column, a post extension of said column, an upright sleeve, to which the machine is secured, rotatable upon said post, means for clamping said sleeve in various positions angularly related to one another, a double pulley rotatable about said post between the column and the sleeve, brackets above and below said pulley carrying pairs of idlers, a belt extending from the upper part of the pulley over the upper idlers to the machine and therefore unaffected by angular adjustment of the position of the machine upon the column, a counter shaft at the lower part of said column, and a belt from said counter shaft passing over the lower idlers to the lower part of the pulley to drive the pulley.

4. The combination with a machine for operating upon shoe parts, of a support, a hollow post carried by said support, an upright sleeve secured to said machine and adapted to be positioned upon the post, means for clamping said sleeve to said post in adjusted position, a treadle pivoted to the support, a treadle connection extending through said sleeve and said hollow post and secured to said treadle, and means for driving said machine in any adjusted position comprising a double pulley rotatable about said post, a drive shaft, and belt connections from said drive shaft to said pulley and from said pulley to said machine.

5. The combination with a machine for operating upon shoe parts, having a driven pulley and a movable control part to determine the position of a movable part of the machine, of a supporting column, a treadle pivoted upon said column, an upright hollow post secured at the top of the column, means for clamping said machine on the upper end of the post in various angularly related positions, a connection from said control part to said treadle extending through said hollow post and said column, a counter shaft upon said column, a double pulley on said post between said column and the machine, brackets supporting pairs of idlers above and below said pulley, a belt upon said pulley over one pair of idlers to said driven pulley on the machine, and a belt from the lower part of said double pulley over the other pair of idlers to the counter shaft, whereby adjustments in the angular position of the machine will not affect the driving connection or the connection between the control part and the treadle.

MILTON H. BALLARD.